Aug. 7, 1951 P. BRIEND 2,563,453
DEVICE FOR CONTROLLING THE TRAILING EDGE
CAMBER FLAP OF THE WING OF AN AIRCRAFT
Filed Oct. 31, 1945 2 Sheets-Sheet 1
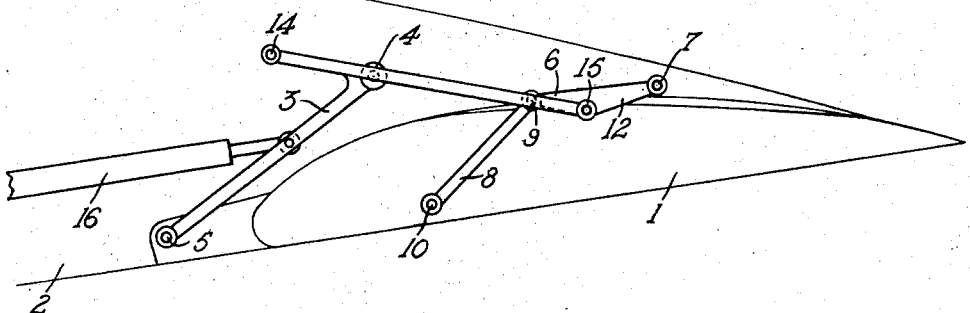
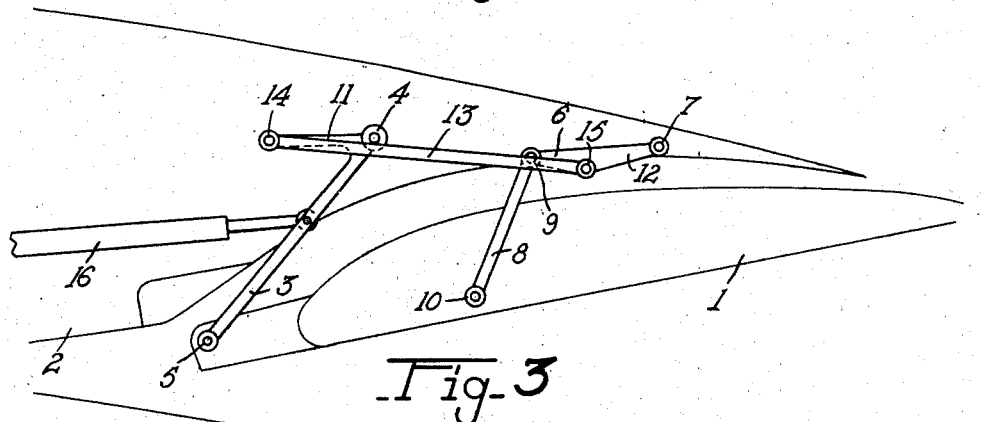
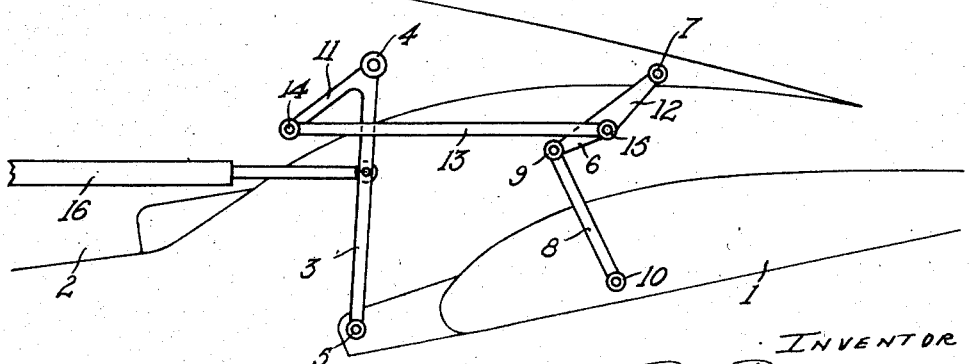
INVENTOR
PAUL BRIEND
By:
Haseltine, Lake & Co
AGENTS

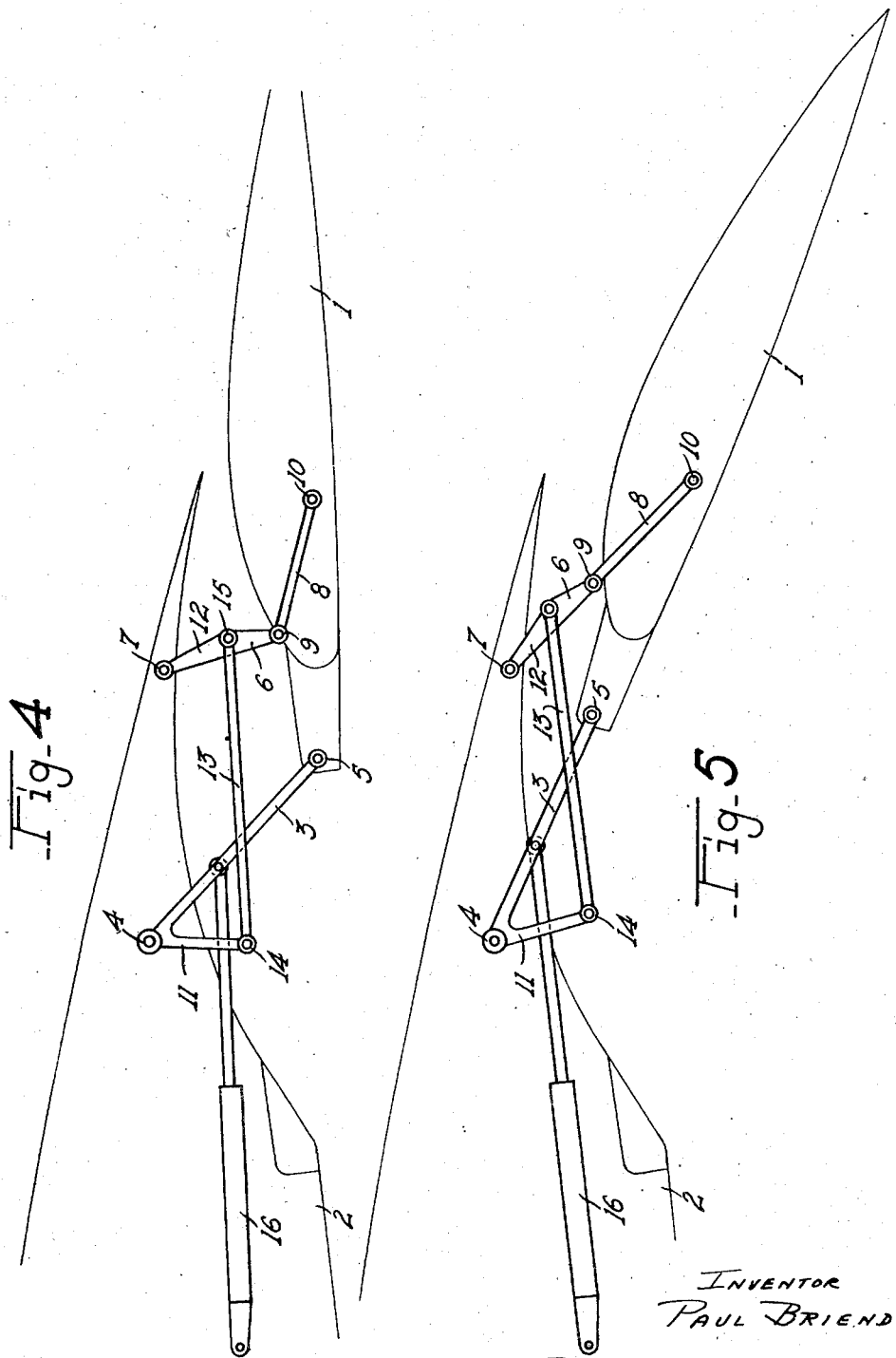

Patented Aug. 7, 1951

2,563,453

UNITED STATES PATENT OFFICE 2,563,453

DEVICE FOR CONTROLLING THE TRAILING EDGE CAMBER FLAP OF THE WING OF AN AIRCRAFT

Paul Briend, Aix-en-Provence, France, assignor to Societe Anonyme Societe Nationale de Constructions Aeronautiques du Sud-Est Application October 31, 1945, Serial No. 625,803
In France January 26, 1945

5 Claims. (Cl. 244—42)

This invention relates to devices for controlling the camber flaps on the trailing edges of the wings of airplanes or seaplanes and contemplates an improvement thereto which has for its object to improve the operation of such flaps and the aerodynamic effect thereof.

It is known that the length of the take-off and landing run of an airplane as well as the take-off and landing speeds are essentially dependent on the aerodynamic qualities of the lifting surface of the plane. Such qualities essentially depend on the shape of the various cross-sections of the surface considered, by a plane parallel to the center plane of the airplane, such cross-section being generally termed aerofoil sections.

The aerofoil sections most favourably satisfying take-off and landing conditions are always very different from those giving the best results in cruising or high speed flight conditions: but it is possible to pass from the first sections to the second sections by means of a change in shape controlled in flight by the pilot. A known solution to this technical problem consists in providing the lifting surfaces at the trailing edges thereof, with movable flaps called camber flaps.

It is experimentally proved, and theoretically confirmed that for best results camber flaps should have a section simultaneously satisfying the two following conditions:

(a) The flap, the hinging supports and the control mechanism thereof should be exactly contained within the areofoil section corresponding to cruising or high speed flight.

(b) The displacement of the flap, in order to attain the operational position thereof, results from the combination of a backward translation and of a rotation or swivelling motion. Both these component motions may occur either simultaneously or in succession.

Usually, in such devices, the displacement of the flap with respect to the fixed portion of the section causes an opening or slot to appear between the two portions. The improvement which constitutes the object of this invention originates in the fact that, for certain conditions of shape of the sections, the aerodynamical effects incurred by the motion of the flap and the opening of the above mentioned slot are increased when the component of the backward motion of the flap reaches a large amplitude. The improvement has thus for its particular object to solve the technical problem consisting in the connection of the camber flap to the structural frame-work of the wing and in guiding it in its motion in such way that:

(a) Where the flap is adjacent to the section, all the members constituting or guiding said flap are comprised within the speed section.

(b) To obtain the desired hypersustentation the camber flap is first displaced backwardly to achieve considerable backward displacement, while remaining substantially parallel and maintaining throughout this movement aerodynamically correct consecutive positions and is then subjected, when fully extended, to the pivotal displacement providing the desired camber and the appropriately shaped slit.

To this end, the improvement is chiefly characterized by the fact that the guiding system of the flap with respect to the aerofoil section is composed of hinged rods which constitute together with the flap and the wing structure a quadrangle which is substantially a parallelogram, in such a way that the distortion of said quadrangle will cause the flap to be subjected to a translation, while one of said hinged rods is of variable length to produce the pivotal displacement of the flap, the adjustment of the length of said rod being operatively related to the distortion of said quadrangle so as to substantially occur only in the rear position of the flap.

The accompanying drawings represent, by way of example only, a form of embodiment of the invention combining all the above features.

Fig. 1 shows the arrangements of the supporting members and of the controlling members in the aerofoil section corresponding to cruising or high speed flight conditions.

Fig. 2 corresponds to the instant where the flap starts to separate from the section.

Fig. 3 gives the position of the various members after a certain amount of backward displacement of the flap.

Fig. 4 shows the position of the same members, when the flap nears its position of full extension and begins to be subjected to a more definite pivoting motion.

Fig. 5 corresponds to the extreme backward position of the flap.

The supporting members connecting the camber flap 1 to the fixed portion 2 of the wing are:

(1) A lever member 3 pivoting about an axis or pin 4 remaining stationary with respect to the framework of the non-movable part of the wing. This member, which extends forwardly and downwardly from its pivotal mounting in the retracted position of the flap, comprises at the end thereof a pivotal connection 5 about which may rotate a part 5a rigidly connected to the front of said flap.

(2) A lever-link member comprising a lever member 6 rotating about a pin 7 which remains stationary with respect to the framework of the non-movable portion of the wing and a link member 8 hinged at 9 on the lever 6. The link 8 comprises at its opposite end a pivotal connection 10 about which is rotatable the camber flap.

The rotational movements of the levers 3 and 6 about pins 4 and 7 are operatively connected to each other through mechanical elements causing a certain kinematic relationship or law to exist between such rotations. In the example shown such elements are constituted by two lever portions 11 and 12 respectively rotatable about pins 4 and 7 and rigidly connected either directly or through said pins to levers 3 and 6 so that said levers are at all time subjected to uniform angular displacement.

Lever portions 11 and 12 are connected to each other through a connecting link 13 hinged to said lever portions at 14 and 15.

In the arrangement shown, the controlling member is a hydraulic jack 16 engaging lever 3.

All devices constituted as above operate as follows:

Under the action of jack 16, lever 3 and lever 11 rotate as a whole about axis 4 thus causing:

(1) The camber flap 1 to be displaced about the axis 5

(2) Lever portions 6 and 12 to rotate as a whole about axis 7 under the action of the connecting link 13.

The lever 6 draws in its motion the connecting link 8. To each position of the lever 3 and therefore of the axis or pin 5 is thus made to correspond a single position of lever 6 and consequently of the axis 9 common to the lever and to the link 8. Said link 8 having a constant length, the second pivotal point 10 carrying the flap is spaced at a constant distance from axis 9. Inasmuch as said pivotal point is constructionally also at a constant distance from the first pivotal point 5 of the camber flap, said point 10 may only occupy one position for each position of the lever 3.

To each position of the jack 16, therefore corresponds a single position of the pivotal connections 5 and 10 and therefore a single position of the flap.

The same discussion applies to any member of the mechanism which may be controlled by the member 16. The movements of all the parts are therefore related to each other and such result is achieved solely by coupled rotations without the use of any slide members or other similar mechanical guiding devices.

The controlling member 16 may be a hydraulic or pneumatic jack or a mechanical member such as a worm, a crank and connecting rod system or any other known device.

By an appropriate choice of the various elements of the above mechanism, the same may be made to acquire further particular properties, as follows:

The movement of the camber flap depends solely on the choice of the position of the main pivotal connections 4 and 7, on the initial position and length of the connecting links 8 and 13 and on the position of the pivotal connections 5 and 10 with respect to the section of the flap.

In the example shown, the initial positions and the lengths of the levers 3, 11 and 12 and of the links 13 are such that at the beginning of the rotation of levers 3 and 11 together from their flap retracted positions, a slight contraction of the broken element 6—8 is effected and is followed by an extension of that broken element which increases progressively until the fully extended position is reached, in which position the pivotal points 7, 9 and 10 are aligned (Fig. 5).

As may be seen from the consecutive Figures 1 to 5 the consequences of above defined property of the selection of the other factors are the following:

(1) Between the initial and final positions, the camber flap is subjected to a substantial backward displacement.

(2) The camber flap remains substantially parallel during the first phase of the movement, which fact is generally advisable from an aerodynamic point of view, and takes on a substantial angular displacement only towards the final phase of the backward displacement.

(3) At the very end of the run, the axes 4, 5 and 10 on one hand and 7 and 10 on the other hand are brought in alignment respectively along two straight lines intersecting at 10.

This fact is desirable from the point of view of play.

At the end of its run, the loads exerted on the flap rapidly increase as a result of its rotation. At the same time, the stresses within elements 6 and 8 are directed substantially coaxially with said elements, which reduces bending stress in said elements and almost completely suppresses any stress in the connecting rod 13.

(4) The position of the pivotal point 10 is selected adjacent to the point of application of the resultant load exerted on the flap so that even when the flap is fully extended, the bending stresses exerted on the lever 3 and the force required to be exerted on the controlling jack 16 remain low.

The use of the mechanical devices described above accomplishes a very considerable improvement in the control of camber flaps on the trailing edge of wings in airplanes and seaplanes, inasmuch as it allows, where the flaps are retracted, to obtain the aerofoil section of the wing suitable for speed flying and on the other hand to obtain at all times throughout the movement of the flap correct aerodynamical positioning of the same and at the end of that movement, an extreme rear position located very far back without requiring excessive effort to be exerted on the controls.

What I claim as my invention and desire to secure by Letters Patent is:

1. In a variable lift wing, a flap movable between an upper retracted position and a lower extended position and forming when retracted a portion of the normal under contour of the wing, a bracket rigidly secured on the front of said flap, and a control device for moving said flap which comprises a first pivot on said wing, a second pivot on said wing to the rear of said first pivot, said pivots being located in the aerofoil section of said wing, a first lever one end of which is pivotally mounted on said first pivot and the other end of which is pivoted on said bracket, said first lever being forwardly and downwardly directed when the flap is retracted, a lever-link member formed by a second lever one end of which is pivotally mounted on said second pivot and by a link the ends of which are respectively pivoted on the other end of said second lever and on the front part of said flap, the line connecting the pivotal points of said lever-link member on said wing and said flap being forwardly and downwardly directed when the flap is retracted, means for varying the angular position of said first lever by rotation thereof about said first wing pivot so that said lever passes below said pivot, whereby said control device has no element projecting above said aerofoil section, means for varying the relative angular position of said second lever with respect to said link as a function of the angular displacement of said first lever according to a predetermined law, so that the resulting unfolding of said lever-link member generates a predetermined lowering movement of said flap with respect to said wing.

2. In a variable lift wing, a flap movable between an upper retracted position and a lower extended position and forming when retracted a portion of the normal under contour of the wing, a bracket rigidly secured on the front of said flap, and a control device for moving said flap which comprises a first pivot on said wing, a second pivot on said wing to the rear of said first pivot, said pivots being located in the aerofoil section of said wing, a first lever one end of which is pivotally mounted on said first pivot and the other end of which is pivoted on said bracket, said first lever being forwardly and downwardly directed when the flap is retracted, a lever-link member formed by a second lever one end of which is pivotally mounted on said second pivot and by a link the ends of which are respectively pivoted on the other end of said second lever and on the front part of said flap, the line connecting the pivotal points of said lever-link member on said wing and said flap being forwardly and downwardly directed when the flap is retracted, means for varying the angular position of said first lever by rotation thereof about said first wing pivot so that said lever passes below said pivot, whereby said control device has no element projecting above said aerofoil section, means for varying the relative angular position of said second lever with respect to said link as a function of the angular displacement of said first lever, so that the resulting unfolding of said lever-link member generates a lowering movement of said flap which comprises, at first, a displacement during which said flap remains substantially parallel and, at the end of said lowering movement, a substantial angular displacement of said flap with respect to its initial position.

3. A variable lift wing, according to claim 2, wherein the means for varying the relative angular position of the second lever with respect to the link as a function of the angular displacement of the first lever comprises a third lever pivotally mounted on the first wing pivot and rigidly connected to said first lever for forming a constant angle with the same, and a second link the ends of which are respectively pivotally connected to the free end of said third lever and to an intermediate point of said second lever.

4. A variable lift wing, according to claim 3, wherein the length of links and levers and the position of their pivotal points are determined so that, during the lowering movement of the flap, the lever-link member is submitted to a slight contraction which is followed by an extension which increases up to the point where the second lever and the first link are aligned and, when the flap is in fully extended position, the line connecting the pivotal points of the first lever passes through the pivotal points of the then aligned lever-link member on the flap.

5. A variable lift wing, according to claim 2, wherein the means for varying the relative angular position of the second lever with respect to the link as a function of the angular displacement of the first lever comprises a third lever pivotally mounted on the first wing pivot and rigidly connected to said first lever for forming a constant angle with the same, and a second link the ends of which are respectively pivotally connected to the free end of said third lever and to an intermediate point of said second lever, and wherein the pivotal point of the lever-link member on the flap is adjacent to the point of application of the resultant load exerted on said flap.

PAUL BRIEND.

REFERENCES CITED

The following references are of record in the file of this patent:

UNITED STATES PATENTS

| Number | Name | Date |
|---|---|---|
| 2,007,086 | Hall | July 2, 1935 |
| 2,252,656 | Youngman | Aug. 12, 1941 |

FOREIGN PATENTS

| Number | Country | Date |
|---|---|---|
| 519,718 | Great Britain | Apr. 4, 1940 |
| 558,006 | Great Britain | Dec. 15, 1943 |